United States Patent Office 3,217,783
Patented Nov. 16, 1965

3,217,783
APPARATUS FOR REMOVING VOLATILE CONSTITUENTS CONTAINED IN LIQUID SYNTHETIC PLASTIC MELTS
Wolf Rodenacker, Dormagen, Germany, assignor to Farbenfabriken Bayer Aktiengesellschaft, Leverkusen, Germany, a corporation of Germany
Filed Dec. 12, 1962, Ser. No. 244,211
Claims priority, application Germany, Dec. 22, 1961, F 35,631
4 Claims. (Cl. 159—2)

The invention relates to an apparatus for removing by evacuation volatile constituents contained in liquid synthetic plastic melts, said apparatus consisting of a vertically arranged container with a supply and distributor device for the melt, an evacuating connection and an outlet for the treated melt.

In the known apparatus of this type, the melt is conveyed into a distributor ring which is arranged on the container wall and from which it flows downwardly on the inside wall of the container. The distributor ring is situated beneath the evacuation opening. The melt which foams strongly when the vacuum is applied is deposited on the wall and particularly above the distributor ring and burns thereon due to the action of oxygen into a black mass which in time enters the stream of melt and discolours the product.

It has now been found that this defect is overcome if a rotatable worm is arranged centrally inside the container, the edges of the thread of said worm wiping over the container wall, and if the lower part of the container is interrupted by an annular transverse slot which communicates with an evacuation chamber.

In this way, the melt which is fed at the top into the evacuation container and which foams strongly under the influence of the vacuum is constantly stripped off by means of the rotating worm from the container wall so that no deposition and burning of the material on the wall can occur. The melt is conveyed downwardly by the threads of the worm, the formation of foam steadily decreasing. During its passage towards the bottom of the container, the melt passes an evacuation slot arranged in the lower part of the container, through which slot the volatile constituents can be withdrawn without the danger of a deposit of the melt being formed, since the foam formation is practically completed at this position. Provision can easily be made at the slot to avoid the dangerous deposit formation and the dropping of any deposit into the clean melt being avoided. The melt is collected beneath the evacuation slot at the base of the container and thereafter is compressed by means of a conveyor worm, the thread volume of which is smaller than that of the stripping worm, so that a vacuum seal is formed.

Figure 1:
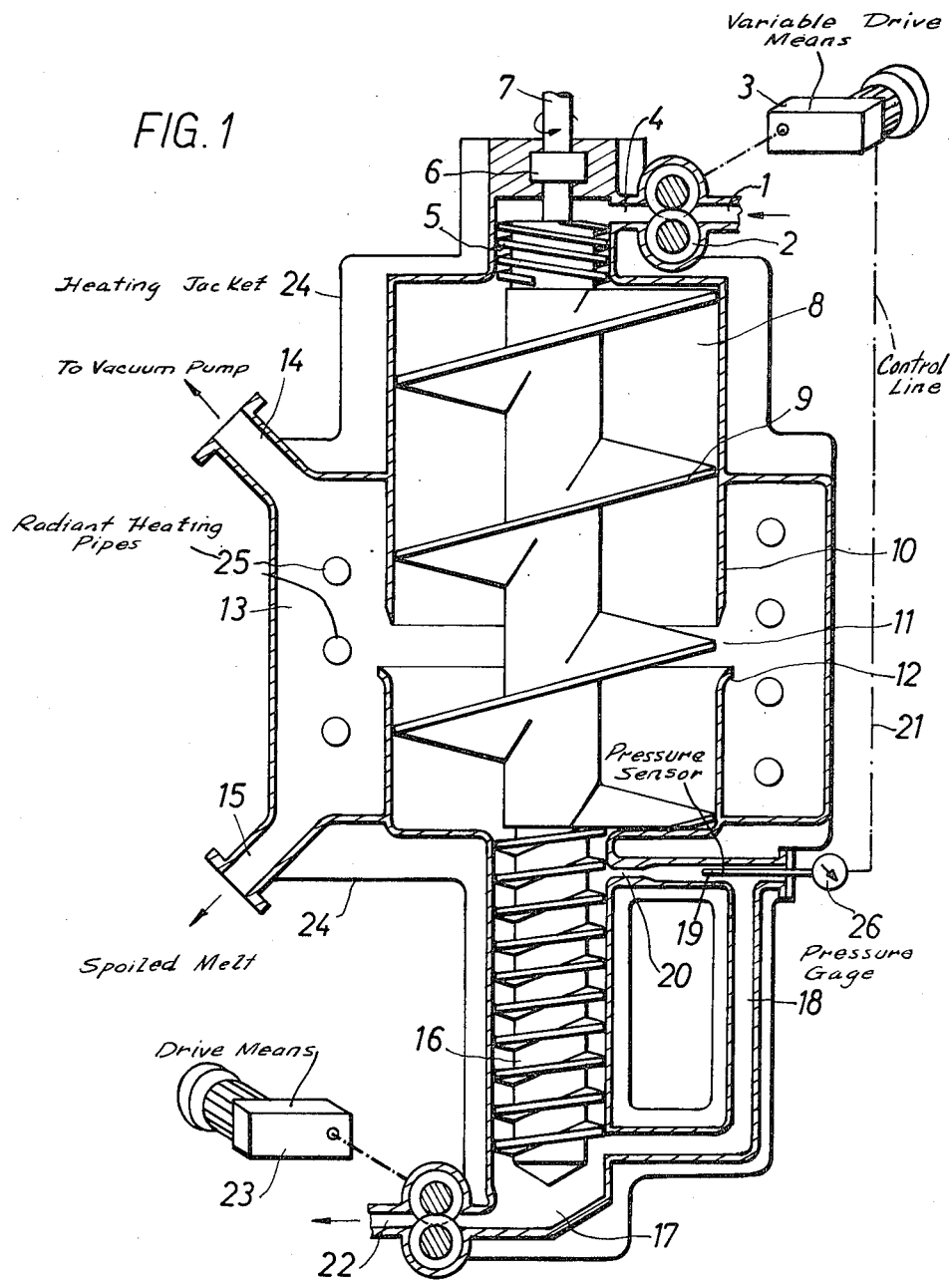

Constructional examples of the arrangement according to the invention are shown diagrammatically in the drawings. FIGURE 1 is a longitudinal section through the complete apparatus and FIG. 2 illustrates one particular form of the passage zone for the melt at the evacuation slot.

From a supply pipe 1 (FIGURE 1) the melt enters a gear pump 2, which is provided with variable drive means 3. The melt enters, by way of the pipe 4, a small worm 5, which is driven through a coupling member 6 serving simultaneously as a stuffing box, and the shaft 7 from drive means (not shown). The worm 5 generates the counter-pressure for the gearwheel pump 2 and provides a seal for the evacuation housing. From the counter-pressure worm 5, the melt enters the evacuation chamber 8, in which the melt foams strongly. Arranged centrally in the evacuation chamber 8 is a worm 9, which is formed with comparatively steep threads and permits the melt to run down under its own weight. The uppermost thread of the worm 9 serves to distribute the foamy material in the evacuation chamber 8. The material moves downwardly and finally no longer contains any bubbles, so that the liquid is stripped off along the wall or runs down over the worm threads. The worm housing 10 is formed with an annular opening 11, which is chosen to be of such a size that the gas velocity therethrough is so small that it cannot entrain any liquid melt. The evacuation chamber 8 is conically enlarged at 12 by a small amount in order to intercept the downwardly flowing melt. The rims of the opening 11 are formed with sharp edges so that no material can settle and the material cannot penetrate further into the evacuation chamber. The evacuation opening 11 is enclosed by an annular chamber 13 which can be evacuated and which is connected through the pipe 14 to a vacuum pump (not shown). Discoloured black melt or material which has flowed over into this chamber 13 can be discharged through the pipe 15. From the funnel-shaped opening 12, the melt enters the lower end of the evacuation chamber, where it experiences a rise in pressure because of the considerable change in the thread volume of a worm 16 which seals off the evacuation chamber 8 towards the lower end. The pressure at the discharge opening 17 of the worm 16 depends on the length of the worm 16 which is wetted by the liquid. This pressure is measured through the pipe 18 by a pressure senser 19. The melt returns through the capillary tube 20 into the worm 16. This arrangement is at the same time suitable for determining the mean value of the viscosity of the melt. The pressure senser 19 acts on the pressure gauge 26, which effects adjustment of the drive means for the gearwheel pump 2 by a simple on-off control through a control line 21. From the sump 17, the melt enters a gear pump 22, which is driven by drive means 23. A constant flow of melt necessary for the further processing leaves the gear pump 22. The exterior of the evacuation chamber 8 is provided with a heating jacket 24, and radiant heating pipes 25 are provided in the annular chamber 13 for maintaining the temperature of the plastic melt at a level which will permit it to flow freely along the worms 5, 9 and 16 and past the annular opening 11.

Figure 2:
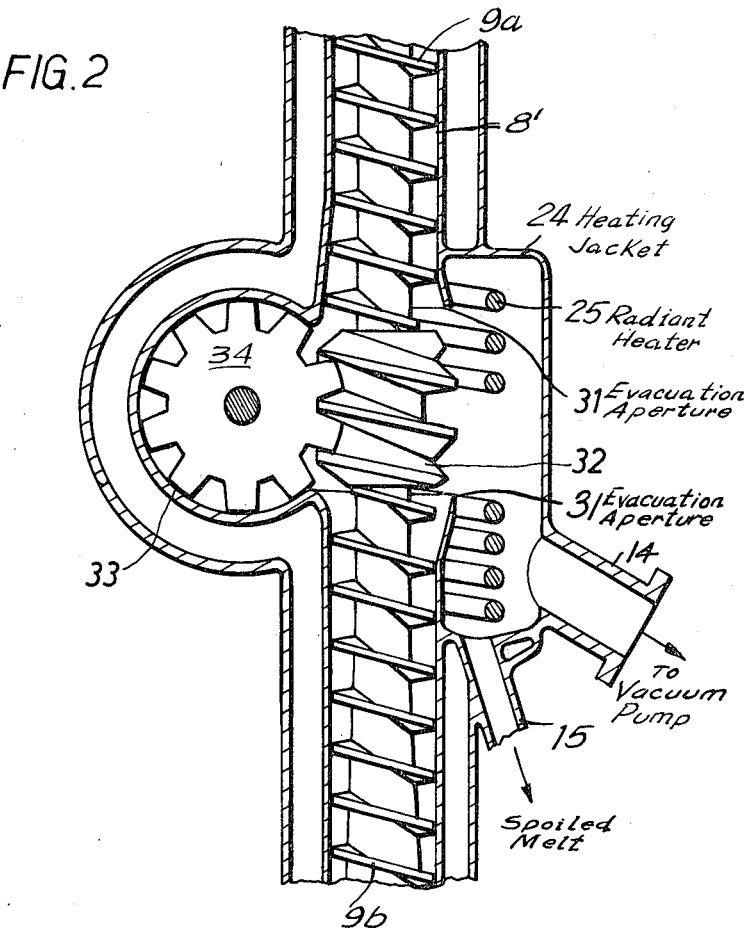

FIGURE 2 shows another embodiment of the invention which is similar in operation to that described in connection with FIGURE 1, but which provides means for scraping the melt in the region of the evacuation aperture 31 in the evacuation chamber 8'. In this embodiment, the plastic melt flows downward through the top portion of the chamber 8', guided by the rotatable worm section 9a and is conveyed thereby past the evacuation aperture 31 into a globoidal worm section 32. The chamber 8' is provided with a housing 33 wherein a worm wheel 34 is rotatably mounted. The worm wheel 34 is in meshing engagement with the worm section 32 which is coaxially mounted and rotates with the upper and lower worm sections 9a and 9b respectively. As the worm wheel 34 is driven by the worm section 32, the plastic melt carried on said worm 32 is scraped clean therefrom and delivered on to the worm 9b, so as to prevent tht formation of deposits. The melt then is carried downward in the chamber 8' and is delivered therefrom by suitable means (not shown) which can be the same as that provided in the embodiment of FIGURE 1.

*Example*

Melts consisting of polycaprolactam are subjected to evacuation to reduce the content of monomeric caprolactam. The efficiency of the evacuation process is determined by the residual oontent of monomer in the melt. With the known apparatus, in which the melt flows down the container wall, it is possible with an input lactam content of 10–12% to obtain final lactam contents of 3.5–4.5%.

With the stirring and motion of the melt in accordance with the present invention, it is possible to obtain final lactam contents of 1.5–2.5% with an input lactam content of 10–12%. This reduction in the lactam content is apparently only a small improvement. However, it represents the saving of a further manufacturing step in the manufacture of fibres, since with a lactam content below 3%, a wet working up of the fibres is superfluous and thus washing and drying can be dispensed with.

I claim:

1. An apparatus for removing volatile components from liquid plastic melts by vacuum treatment, which comprises:
   (a) An evacuation chamber having an inlet for the introduction of liquid plastic melt, an outlet for the removal of devolatized plastic product, and an evacuation aperture, said evacuation aperture being defined by the adjacent peripheral edges of a cut-away portion of said evacuation chamber, said evacuation chamber being substantially cylindrical and vertically disposed, and at least one of the edges of said evacuation aperture being sharply beveled to prevent the adhesion of plastic melt thereto, with the flow of said melt being downward, and one edge of said evacuation aperture being a lower edge which is flared outward to capture said downward flowing melt;
   (b) A rotatable worm for transferring the plastic melt downwardly from the inlet of the evacuation chamber, past the evacuation aperture thereof, and to the outlet of said chamber, said worm being disposed within said chamber and having edges which are in wiping contact with the walls thereof;
   (c) An evacuable enclosure surrounding the evacuation aperture in said evacuation chamber and in communication therewith, said enclosure having means for connection to a vacuum source for the removal of said volatile components;
   (d) Means for rotating said worm whereby when said enclosure and evacuation chamber are evacuated, and the plastic melt is transferred downward within said chamber from the inlet thereof, past the evacuation aperture and to the outlet, the volatile products in said melt are removed and a devolatized plastic product is discharged at the outlet of said chamber.

2. The apparatus of claim 1 wherein means are provided for heating the evacuation chamber and the plastic melt conveyed therein.

3. The apparatus of claim 1 wherein a rotatable worm wheel is provided for wiping the plastic melt from the portion of the worm adjacent to the evacuation aperture, said worm wheel being in meshing engagement with said worm and rotatably driven thereby.

4. The apparatus of claim 3 wherein:
   (a) The evacuation chamber is provided with a housing for rotatably supporting the worm wheel; and,
   (b) The worm which conveys the plastic melt is provided with a globoidal worm section which engages said worm wheel.

References Cited in the file of this patent

UNITED STATES PATENTS

| 2,369,553 | 2/1945 | Fields | 18—2 |
| 2,992,679 | 7/1961 | Twaddle | 159—2 |
| 3,031,030 | 4/1962 | Rodenacker. | |
| 3,067,812 | 12/1962 | Latinen et al. | 159—6 |

FOREIGN PATENTS

| 2,010,039 | 6/1958 | Austria. |
| 1,114,784 | 10/1961 | Germany. |
| 740,825 | 11/1955 | Great Britain. |
| 521,109 | 5/1955 | Italy. |

NORMAN YUDKOFF, *Primary Examiner.*